(12) United States Patent
Shi et al.

(10) Patent No.: US 11,683,123 B2
(45) Date of Patent: Jun. 20, 2023

(54) PACKET PROCESSING METHOD AND APPARATUS, AND COMPUTER STORAGE MEDIUM

(71) Applicant: Huawei Technologies Co., Ltd., Shenzhen (CN)

(72) Inventors: Jiyuan Shi, Nanjing (CN); Qing Chen, Shenzhen (CN); Mingli Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/679,758

(22) Filed: Feb. 24, 2022

(65) Prior Publication Data

US 2022/0182180 A1   Jun. 9, 2022

Related U.S. Application Data

(63) Continuation of application No. PCT/CN2020/114600, filed on Sep. 10, 2020.

(30) Foreign Application Priority Data

Sep. 10, 2019 (CN) .......................... 201910854179.X
Nov. 29, 2019 (CN) .......................... 201911207236.1

(51) Int. Cl.
*H04L 1/00* (2006.01)
*H04L 1/1809* (2023.01)

(52) U.S. Cl.
CPC .......... *H04L 1/0064* (2013.01); *H04L 1/1809* (2013.01)

(58) Field of Classification Search
CPC ... H04L 1/0061; H04L 1/0064; H04L 1/1809; H04L 1/1841; H04L 1/1845
See application file for complete search history.

(56) References Cited

U.S. PATENT DOCUMENTS

| 5,524,001 | A | 6/1996 | Beaudry et al. |
| 7,218,632 | B1 | 5/2007 | Bechtolsheim et al. |
| 9,288,011 | B2 | 3/2016 | Hwang et al. |
| 9,338,263 | B2 * | 5/2016 | Legg .................... H04W 28/06 |
| 2017/0294984 | A1 | 10/2017 | Ramalho et al. |
| 2019/0320347 | A1 * | 10/2019 | Charpentier ............ H04L 47/10 |

FOREIGN PATENT DOCUMENTS

| CN | 101656593 A | 2/2010 |
| CN | 101662335 A | 3/2010 |
| CN | 101667887 A | 3/2010 |
| CN | 108650061 A | 10/2018 |
| JP | H08237300 A | 9/1996 |
| JP | 2006217530 A | 8/2006 |
| WO | 2015135120 A1 | 9/2015 |
| WO | 2018144233 A1 | 8/2018 |

* cited by examiner

*Primary Examiner* — Shelly A Chase
(74) *Attorney, Agent, or Firm* — Conley Rose, P.C.

(57) ABSTRACT

In a packet processing method, concatenation processing is performed on other original packets other than a largest first packet in a plurality of original packets. Padding processing is performed on a concatenated packet only when a size of the concatenated packet is less than a size of a largest packet, without performing padding processing on each of the other original packets.

20 Claims, 10 Drawing Sheets

PACKET PROCESSING METHOD AND APPARATUS, AND COMPUTER STORAGE MEDIUM

CROSS-REFERENCE TO RELATED APPLICATIONS

This is a continuation of Int'l Patent App. No. PCT/CN2020/114600, filed on Sep. 10, 2020, which claims priority to Chinese Patent App. No. 201910854179.X, filed on Sep. 10, 2019, and Chinese Patent App. No. 201911207236.1, filed on Nov. 29, 2019, all of which are incorporated by reference.

FIELD

This disclosure relates to the field of data encoding technologies, and in particular, to a packet processing method and apparatus, and a computer-readable storage medium.

BACKGROUND

With development of encoding and decoding technologies, when transmitting a data stream, a network device may first perform forward error correction (FEC) encoding on a plurality of original packets in the data stream to obtain redundant packets, and send the original packets and the redundant packets to a decoder.

Currently, a process of encoding the plurality of original packets by the network device may be as follows: The network device pads dummy data in other packets other than a largest packet in the plurality of original packets, so that sizes of the padded packets are all a size of the largest packet in the plurality of original packets. The network device performs FEC encoding on the padded packets and the largest packet, to obtain the redundant packets.

In the foregoing encoding process, because the network device pads the dummy data in each original packet that is less than the largest packet, a large amount of dummy data is padded in the padded original packets, and a data amount of the padded original packets is large. When the network device sends the padded original packets to the decoder, the padded original packets occupy a large amount of network bandwidth, causing a waste of network resources.

SUMMARY

This disclosure provides a packet processing method and apparatus, and a computer-readable storage medium, to reduce occupied network bandwidth in a packet sending process, and avoid a waste of network resources. The technical solutions are as follows.

According to a first aspect, a packet processing method is provided. The method includes: obtaining a plurality of original packets; performing concatenation processing on other original packets other than a first packet in the plurality of original packets based on a size of the first packet in the plurality of original packets, to obtain at least one concatenated packet, where the first packet is a largest packet in the plurality of original packets; when a size of any concatenated packet in the at least one concatenated packet is less than the size of the first packet, performing padding processing on the at least one concatenated packet to obtain an equal-length data block, where a size of each data block in the equal-length data block is the size of the first packet; and performing FEC encoding processing on the first packet and the equal-length data block, to obtain at least one redundant packet.

In this method, concatenation processing is performed on other original packets other than a largest first packet in a plurality of original packets. Padding processing is performed on a concatenated packet only when a size of the concatenated packet is less than a size of a largest packet, without performing padding processing on each of the other original packets. Therefore, less data needs to be padded to obtain an equal-length data block after padding. This reduces occupied network bandwidth when FEC encoding packets are transmitted, and avoids a waste of network resources.

In a possible implementation, the performing concatenation processing on other original packets other than the first packet in a plurality of original packets based on the size of the first packet in the plurality of original packets, to obtain the at least one concatenated packet includes: grouping the other original packets other than the first packet in the plurality of original packets based on the size of the first packet in the plurality of original packets, to obtain at least one packet group, where each packet group includes at least one original packet, and a sum of sizes of all original packets in each packet group is less than or equal to the size of the first packet; and performing concatenation processing on each packet group, to obtain the at least one concatenated packet, where each concatenated packet corresponds to one packet group.

In a possible implementation, the performing concatenation processing on other packets other than the first packet in the plurality of original packets, based on the size of the first packet in the plurality of original packets, to obtain the at least one concatenated packet includes: grouping, by a processor, the other original packets other than the first packet in the plurality of original packets, based on the size of the first packet in the plurality of original packets, to obtain at least one packet group, and generating an encoding task based on the at least one packet group, where the encoding task includes address information of each packet group; and performing, by a target hardware engine, concatenation processing on each packet group based on the encoding task, to obtain the at least one concatenated packet.

In a possible implementation, the grouping the other original packets other than the first packet in the plurality of original packets based on the size of the first packet in the plurality of original packets, to obtain at least one packet group includes: sorting the plurality of original packets based on a size of each original packet in the plurality of original packets, to obtain an order i of each original packet, where i is an integer greater than or equal to 0, and an original packet whose order is 0 is the first packet; when i=1, grouping an original packet whose order is 1 into a first target packet group, where an order of the first target packet group is 1; when i>1, if a sum of a size of a $j^{th}$ target packet group and a size of the original packet whose order is i is less than or equal to a target size, combining the $j^{th}$ target packet group and the original packet whose order is i into an $i^{th}$ target packet group, where the target size is the size of the first packet, the $j^{th}$ target packet group is a packet group with a lowest order in at least one target packet group, an order of the $j^{th}$ target packet group is j, a sum of a size of each packet group in the at least one target packet group and the size of the original packet whose order is i is less than or equal to the target size, and $0<j<i$; or when i>1, if the $j^{th}$ target packet group does not exist, adding one $i^{th}$ target packet group, and grouping the original packet whose order is i into the $i^{th}$ target packet group; and after grouping a last original packet in the plurality of original packets, using each currently remaining target packet group as one packet group in the at least one packet group.

In a possible implementation, the performing concatenation processing on each packet group, to obtain the at least one concatenated packet includes: when a sum of a quantity of at least one packet groups and a quantity of the first packets in the plurality of original packets reaches a first target quantity, and other original packets other than the plurality of original packets cannot be added to the at least one packet group, performing concatenation processing on each packet group, where the first target quantity is a dimension of a to-be-encoded matrix when FEC encoding is performed; or when a quantity of the plurality of original packets is equal to a second target quantity, and the second target quantity of original packets are grouped into at least one packet group, performing concatenation processing on each packet group, where the second target quantity is a preset quantity of original packets required to perform FEC coding once.

In a possible implementation, the method further includes: when a size of each concatenated packet in the at least one concatenated packet is equal to the size of first packet, performing FEC encoding processing on the first packet and the at least one concatenated packet to obtain at least one redundant packet.

According to a second aspect, a packet processing apparatus is provided, including a plurality of functional modules, where the plurality of functional modules collaborate to implement the method according to the first aspect and the implementations of the first aspect. The plurality of functional modules may be implemented based on software, hardware, or a combination of software and hardware, where the plurality of functional modules may be randomly combined or divided based on a specific implementation.

According to a third aspect, a computer-readable storage medium is provided. The storage medium stores instructions. The instructions are loaded and executed by a processor to implement the foregoing packet processing method.

BRIEF DESCRIPTION OF THE DRAWINGS

To describe technical solutions more clearly, the following briefly describes accompanying drawings for describing embodiments. It is clear that the accompanying drawings in the following descriptions show merely some embodiments, and a person of ordinary skill in the art may further derive other accompanying drawings from these accompanying drawings without creative efforts.

DETAILED DESCRIPTION

To make the objectives, technical solutions, and advantages clearer, the following further describes embodiments in detail with reference to the accompanying drawings.

Figure 1:
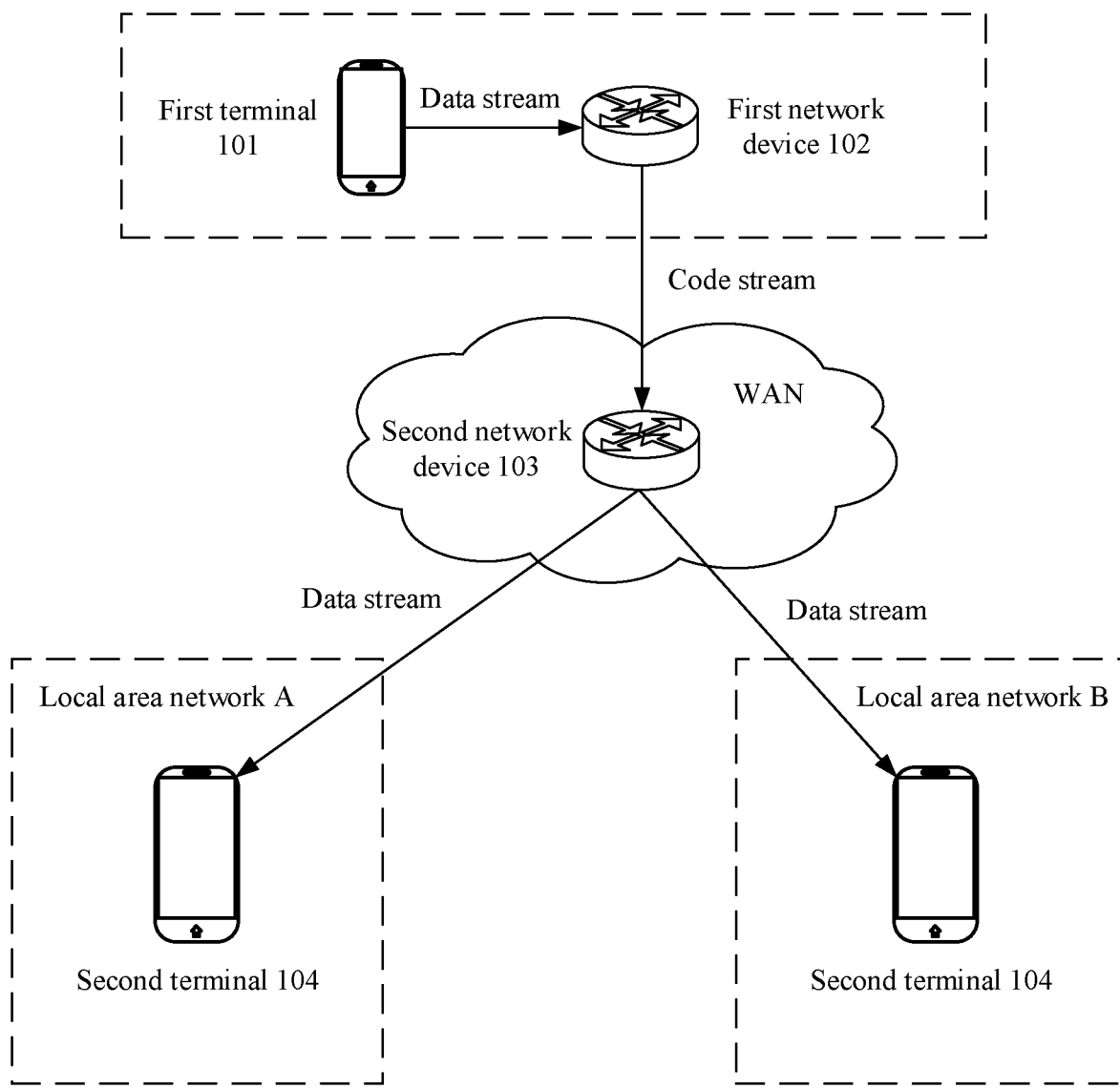
FIG. 1 is a schematic diagram of a packet transmission system according to an embodiment.

FIG. 1 is a schematic diagram of a packet transmission system according to an embodiment. FIG. 1 depicts a first terminal 101, a first network device 102, a second network device 103, and a second terminal 104. The first terminal 101 is configured to generate a data stream, and send the data stream to the first network device 102. The first network device 102 concatenates a plurality of original packets in the data stream into one equal-length data block, where each data block of the equal-length data block has a same size. FEC encoding processing is performed on the equal-length data block, to obtain redundant packets in the plurality of original packets. The first network device 102 adds a same FEC header to each data block of the equal-length data block and each redundant packet, encapsulates them into a plurality of FEC packets, and then sends a code stream including the FEC packets to the second network device 103. The second network device 303 decodes a lost original FEC packet in the code stream, to recover the lost original FEC packet. The original FEC packet is any one of the FEC packets. The second network device 103 recovers the data stream based on the recovered original FEC packet and unlost FEC packets, and sends the data stream to the second terminal 104. The first terminal 101 and the second terminal 104 may be mobile phones, laptop computers, and the like. The first network device 102 and the second network device 103 may be devices such as routers and switches. The data stream may be a video stream, an audio stream, or may be a text stream including text data. Data stream types are not specifically limited in the embodiments.

FIG. 1 is a schematic diagram depicting an example of the video stream. When a first user and a second user conduct a video session, the first user may record a video of the first user by using a camera in a first terminal 101, and send, to the first network device 102, original packets used to constitute a video, so as to form the video stream (the data stream). The first network device 102 performs FEC encoding on the original packets in the video stream to obtain redundant packets, and adds an FEC packet header to each original packet and each redundant packet to obtain a corresponding FEC packet. The first network device 102 may send the code stream including the FEC packet to the second network device 103 over a wide area network (WAN). After obtaining the FEC packet in the code stream, the second network device 103 determines which original packets are lost based on the FEC packet header, and recovers the lost original packets based on the received FEC packet (including the original packet and the redundant packet). The second network device 103 forms the data stream by using the recovered original packets and unlost original packets, and sends the data stream to a second terminal 104 in a local area network A and a second terminal 104 in a local area network B respectively. After receiving the video stream, the plurality of second terminals 104 play the video. Therefore, the second user can watch the video of the first user on the second terminal 104. This implements a cross-LAN video session between the first user and the second user. In a possible implementation, the first terminal 101, the first network device 102, the second network device 103, and the second terminal 104 may be distributed in a same or different local area networks. Distribution manners of the first terminal 101, the first network device 102, the second network device 103, and the second terminal 104 are not specifically limited in the embodiments.

In some possible implementations, the first network device may directly perform concatenation processing on the original packets in the data stream by using a processor, to obtain the equal-length data block, and then the processor performs FEC encoding on the equal-length data block. In some possible implementations, the processor in the first network device may determine a concatenation solution based on a size of each original packet, and send the concatenation solution to a target hardware engine. The target hardware engine performs concatenation processing on the original packets in the data stream according to the concatenation solution provided by the processor, to obtain the equal-length data block, and perform FEC encoding on the equal-length data block. The processor may be a network processor (NP), a central processing unit (CPU), or a combination thereof. The processor may further include a hardware chip. The hardware chip may be an application-specific integrated circuit (ASIC), a programmable logic device (PLD), or a combination thereof. The PLD may be a complex PLD (CPLD), a field-programmable gate array (FPGA), a generic array logic (GAL) device, or any combination thereof.

Optionally, the embodiments further provide a computer-readable storage medium, for example, a memory including instructions. The instructions may be executed by the processor in the network device to complete methods provided in the following embodiments. For example, the computer-readable storage medium may be a read-only memory (ROM), a random-access memory (RAM), a compact disc ROM (CD-ROM), a magnetic tape, a floppy disk, an optical data storage device.

Figure 2:
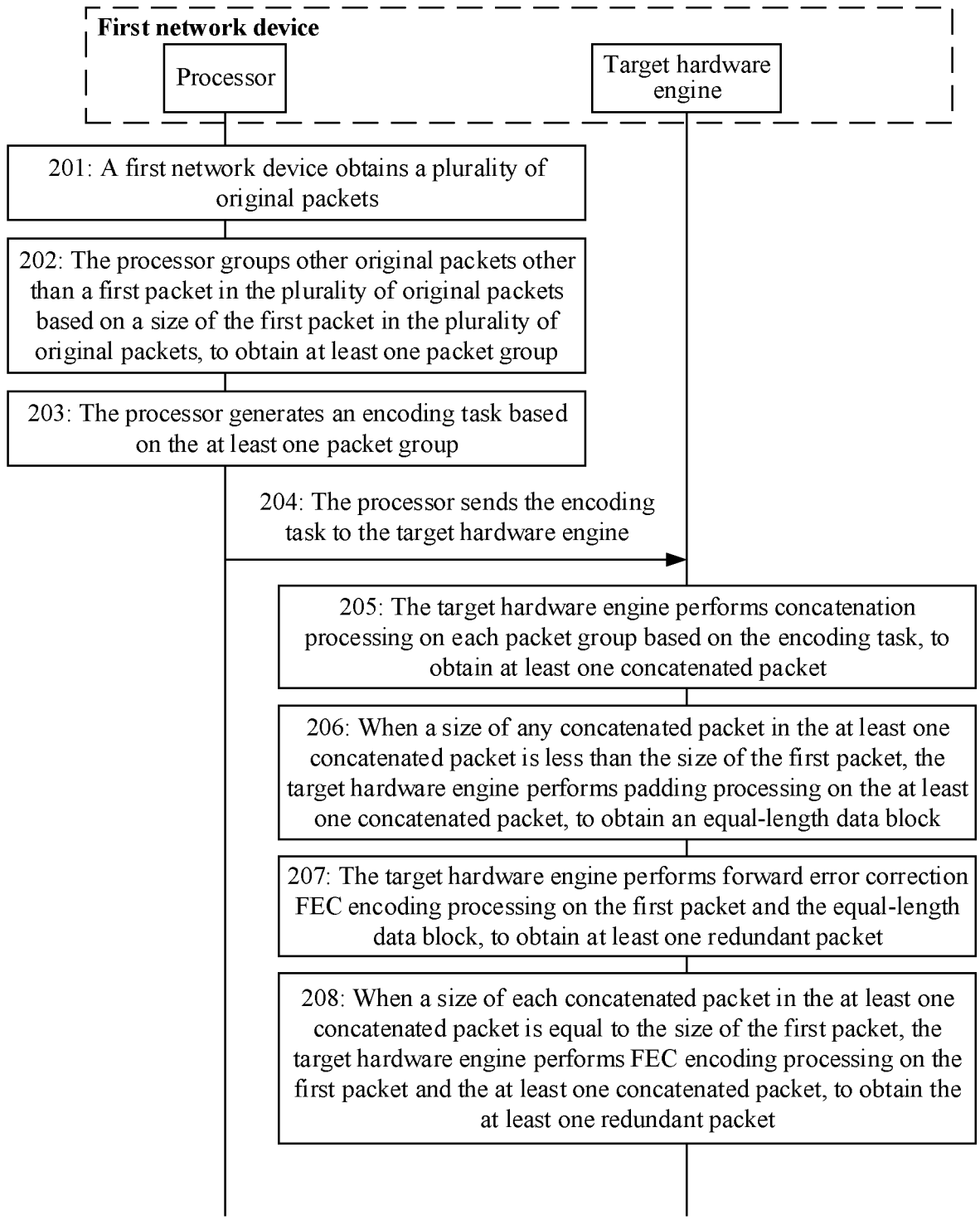
FIG. 2 is a flowchart of a packet processing method according to an embodiment.

For further description of the process in which the first network device encodes the original packets in the data stream, refer to a flowchart of a packet processing method according to the embodiment shown in FIG. 2. A process of the method may specifically include the following steps 201 to 208. In a possible implementation, when the process shown in FIG. 2 is described, steps included in the entire process in FIG. 2 are first described, and the steps are further described in detail.

201: A first network device obtains a plurality of original packets.

The first network device may obtain a plurality of data streams. The plurality of original packets are packets in a first data stream in the plurality of data streams, and are packets used by the first network device to perform FEC encoding once. The first data stream is any data stream in the plurality of data streams and may include a plurality of original packets. Each original packet is used to carry data. The data carried in the original packet may be video data, audio data, text data, and the like. Types of the data in the first data stream are not specifically limited in this embodiment.

202: The processor groups other original packets other than a first packet in the plurality of original packets based on a size of the first packet in the plurality of original packets, to obtain at least one packet group, where each packet group includes at least one original packet, and a sum of sizes of all original packets in each packet group is less than or equal to a size of the first packet.

203: The processor generates an encoding task based on the at least one packet group, where the encoding task includes address information of each packet group.

204: The processor sends the encoding task to a target hardware engine.

In some possible implementations, the processor may further deliver the encoding task to a memory, from which the target hardware engine reads the encoding task. In some possible implementations, the processor may further deliver the encoding task to the memory or the target hardware engine based on priorities of the data streams. The processor may first deliver an encoding task of a high-priority data stream, and then deliver an encoding task of a low-priority data stream. Manners of delivering the encoding task by the processor are not specifically limited in this embodiment.

205: The target hardware engine performs concatenation processing on each packet group based on the encoding task, to obtain at least one concatenated packet.

206: When a size of any concatenated packet in the at least one concatenated packet is less than the size of the first packet, the target hardware engine performs padding processing on the at least one concatenated packet to obtain an equal-length data block, where a size of each data block in the equal-length data block is the size of the first packet.

The target hardware engine may pad the any concatenated packet with target data, to obtain a data block whose size is the size of the first packet. The target data may be data such as 0 or 1. After padding the at least one concatenated packet, the target hardware engine obtains the equal-length data block. Each data block in the equal-length data block corresponds to one concatenated packet, and the size of each data block is the size of the first packet.

In a possible implementation, when the first network device encodes the plurality of original packets by using the processor, step 206 may be performed by the processor.

207: The target hardware engine performs FEC encoding processing on the first packet and the equal-length data block, to obtain at least one redundant packet.

208: When a size of each concatenated packet in the at least one concatenated packet is equal to the size of the first packet, the target hardware engine performs FEC encoding processing on the first packet and the at least one concatenated packet, to obtain the at least one redundant packet.

The following describes the steps shown in FIG. 2 in detail.

In step 201, the first network device may perform FEC encoding on the plurality of original packets in the data stream, and after completing FEC encoding once, the first network device performs FEC encoding on a plurality of other original packets in the data stream. In a possible implementation, step 201 may be performed in a process shown in the following steps 2011 and 2012.

Step 2011: The first network device stores the original packets in the received data stream into the memory in the first network device.

Figure 3:
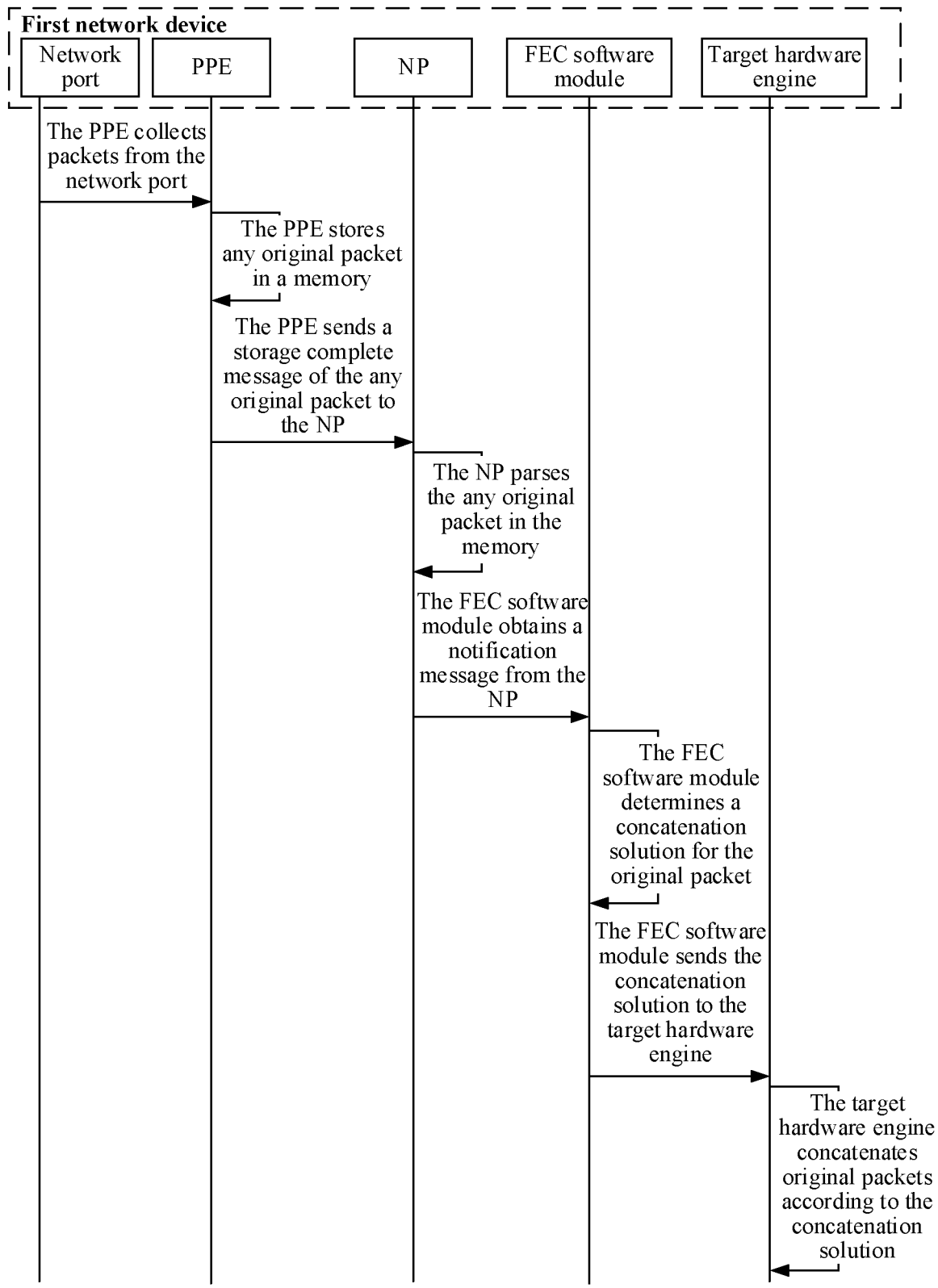
FIG. 3 is a flowchart of a packet processing method implemented in a network device according to an embodiment.

For example, FIG. 3 is a flowchart of a packet processing method implemented in a network device according to an embodiment of the present disclosure. After receiving one original packet in the data stream, a network port of the first network device sends the original packet to a packet parse engine (PPE). Each time after the PPE receives the original packet, the PPE stores the original packet in the memory, and records a storage address of the original packet, so that the PPE can collect the original packet that is in the data stream and that is received by the network port. The network port may be a Gigabit Ethernet (GE) network port or a 10 Gigabit Ethernet (10GE) network port.

Step 2012: If a quantity of un-coded original packets in the data stream in the memory is equal to or greater than a second target quantity, the processor obtains the second target quantity of original packets from the un-coded original packets in the data stream, where the second target quantity is a preset quantity of original packets required to perform FEC coding once.

After performing FEC encoding once on the second target quantity of original packets, the first network device encodes a next group of the second target quantity of un-coded original packets. Therefore, each time the memory in the first network device newly buffers the second target quantity of original packets in the data stream, the second target quantity of the newly buffered original packets may be used as a plurality of original packets to be encoded next time.

The processor includes at least one of an NP and a CPU. FIG. 3 is still used as an example for description. Each time the PPE collects a first original packet, the PPE stores the first original packet in the memory, and sends a storage complete message of the first original packet to the NP. The storage complete message of the first original packet may carry a stream identifier of the first data stream to which the first original packet belongs and a storage address of the first original packet. The stream identifier may be a name or a number of the first data stream, and is used to indicate that the first original packet belongs to the first data stream. The first original packet is any original packet in the first data stream.

In a possible implementation, the first network device sets a corresponding priority for each received data stream based on a service requirement. The first network device may preferentially process a high-priority data stream. Correspondingly, the storage complete message may further carry the priority of the data stream. In this way, modules in the first network device may process the original packets in the data stream based on priorities. A priority information table may be configured on the first network device. The priority information table includes a plurality of priorities in descending order, and each priority corresponds to a service type. When receiving one data stream, the first network device may determine a service type of the data stream based on data carried in original packets in the data stream, and determines, according to the priority information table, a priority corresponding to the service type of the data stream. In this way, the first network device may set a corresponding priority for the data stream.

FIG. 3 is still used as an example for description. After receiving the storage complete message of the first original packet, the NP parses the first original packet in the memory based on the storage address that is of the first original packet and that is carried in the storage complete message, to determine whether the first original packet needs to be encoded. If the first original packet needs to be encoded, the NP generates an encoding notification message, where the encoding notification message may carry at least one of the storage address of the first original packet, a size of the first original packet, a stream identifier of the first data stream, and a priority of the first data stream. The NP sends the encoding notification message to a protocol stack. A User Datagram Protocol (UDP) proxy may collect the encoding notification messages from the protocol stack. Each time the UDP proxy newly collects a second target quantity of encoding notification messages, the second target quantity of the newly collected encoding notification messages may indicate that the second target quantity of to-be-encoded original packets are newly stored in the memory. Therefore, the UDP proxy may send the second target quantity of encoding notification messages to an FEC software module (this process is a process in which the FEC software module obtains the notification message from the NP). The FEC software module determines a concatenation solution for the second target quantity of original packets.

In some possible implementations, the first network device does not limit a quantity of original packets on which FEC encoding is performed each time, but limits a quantity of to-be-encoded original packets on which FEC encoding is performed each time. The quantity of the to-be-encoded original packets is a dimension of a to-be-encoded matrix when FEC coding is performed. In other words, the first network device does not preset the second target quantity, but presets a first target quantity. In this case, each time the UDP proxy receives one encoding notification message, the UDP proxy sends the encoding notification message to the FEC software module, so that the FEC software module can obtain the plurality of encoding notification messages. When the FEC software module may obtain sizes of the plurality of original packets from the plurality of encoding notification messages, the FEC software module may determine a largest first packet from the plurality of original packets, and determine a third target quantity of concatenation solutions based on a size of the largest packet (denoted as a target size) and sizes of packets other than the first packet in the plurality of original packets (that is, the process in which the FEC software module determines the concatenation solution for the original packets in FIG. 3). In each concatenation solution, at least two original packets are concatenated into one concatenated packet, a size of each concatenated packet is less than or equal to the target size, and a sum of the third target quantity and a quantity of first packets in the plurality of original packets is equal to the first target quantity. For a specific process of determining the concatenation solution, refer to step 202. Then, the FEC software module sends the concatenation solution to the target hardware engine. The target hardware engine concatenates the original packets according to the concatenation solution.

The following describes step 202.

In step 202, the first packet is the largest packet in the plurality of original packets, and each packet group may be considered as one concatenation solution. A process of determining the packet group is also the process of determining the concatenation solution. To make a size of each packet group less than or equal to the size of the first packet, the size of each packet group is the sizes of all the original packets in each packet group. The processor may first sort the plurality of original packets based on the sizes of the plurality of original packets, and then determine at least one packet group based on the sorting of the plurality of original packets and the size of the first packet. In a possible implementation, step 202 may be performed in the following processes shown in steps 2021 to 2025. In a possible implementation, this step may be performed by the FEC software module in the processor.

Step 2021: The processor sorts the plurality of original packets based on the sizes of the plurality of original packets, to obtain an order i of each original packet, where i is an integer greater than or equal to 0, and an original packet whose order is 0 is the first packet.

Figure 4:
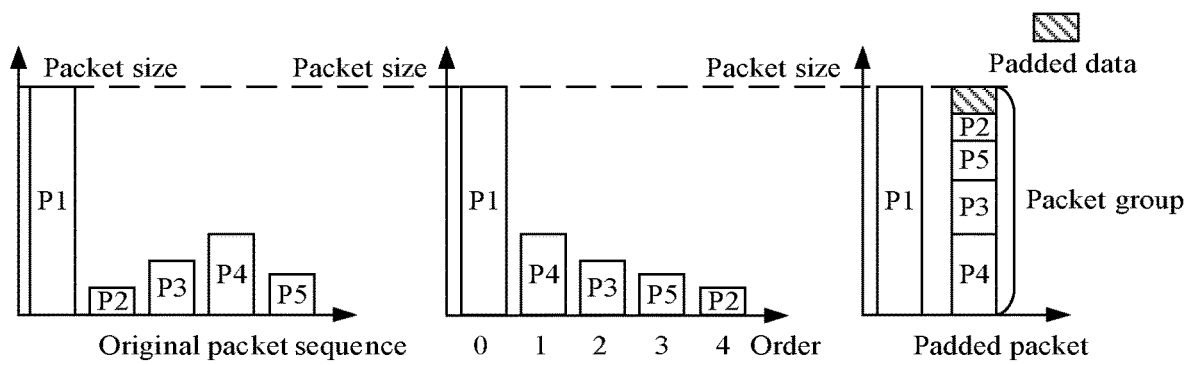
FIG. 4 is a schematic diagram of a packet group determining process according to an embodiment.

When the processor sorts the plurality of original packets, a larger original packet has a lower order, and a smaller original packet has a higher order. Because the first packet is the largest packet in the plurality of original packets, the first packet has a lowest order being 0. A smallest original packet in the plurality of original packets has a highest order. For example, FIG. 4 is a schematic diagram of a packet group determining process according to an embodiment. FIG. 4 includes a left part, a middle part, and a right part. The left part includes an original packet sequence. Five original packets in the original packet sequence are packets P1 to P5. The packet P1 is the first packet. The processor sorts the packets P1 to P5 based on sizes of the packets P1 to P5, to obtain sorting of the five packets shown in the figure: the packet P1, the packet P4, the packet P3, the packet P5, and the packet P2, where orders are 0 to 4.

Step 2022: When i=1, the processor groups an original packet whose order is 1 into a first target packet group, where an order of the first target packet group is 1.

Because the size of the first packet is the target size, the processor does not need to group the first packet, or may directly consider each first packet as one packet group. The processor may sequentially group the other original packets other than the first packet according to an ascending order of the plurality of original packets. The middle part in FIG. 4 is still used as an example. The order of the packet P4 is 1. The processor may directly group the packet P4 into the first target packet group.

Step 2023: When i>1, if a sum of a size of a $j^{th}$ target packet group and a size of the original packet whose order is i is less than or equal to the target size, the processor combines the $j^{th}$ target packet group and the original packet whose order is i into an $i^{th}$ target packet group, where the target size is the size of the first packet, the $j^{th}$ target packet group is a packet group with a lowest order in at least one target packet group, an order of the $j^{th}$ target packet group is j, a sum of a size of any packet group in the at least one target packet group and the size of the original packets whose order is i is less than or equal to the target size, and 0<j<i.

A size of the target packet group is a sum of sizes of all packets in the target packet group. The $j^{th}$ target packet group is a packet group including an original packet whose order is j. An $i^{th}$ target packet group is a packet group including an original packet whose order is i. In other words, after j original packets are grouped, the $j^{th}$ target packet group is obtained. After i original packets are grouped, the $i^{th}$ target packet group is obtained. Because the processor groups the plurality of original packets, there may be a plurality of target packet groups in a grouping process. For ease of description, an order is allocated to each target packet group. An order of the $j^{th}$ target packet group is j, and an order of the $i^{th}$ target packet group is i. In other words, an order of a target packet group is how it is sorted.

The middle part in FIG. 4 is still used as an example. When i=2, the processor groups the packet P3 whose order is 2. In this case, the first target packet group includes only the packet P4. A sum of a size of the first target packet group and a size of the packet P3 whose order is 2 is a sum of sizes of the packets P4 and P3. If the sum of the sizes of the packets P4 and P3 is less than or equal to the size (that is, the target size) of the first packet P1, the processor combines the packets P4 and P3 into a second target packet group. Because the first target packet group is combined into the second target packet group, currently only the second target packet group remains.

In some possible implementations, currently a plurality of target packet groups may remain. If a sum of a size of each packet group in the at least one target packet group in the plurality of target packet groups and a size of the original packet whose order is i is less than or equal to the target size, the processor combines the original packet whose order is i and the $j^{th}$ target packet group into the $i^{th}$ target packet group. The $j^{th}$ target packet group is the packet group with the lowest order in the at least one target packet group.

Step 2024: When i>1, if the $j^{th}$ target packet group does not exist, the processor adds the $i^{th}$ target packet group, and groups the original packet whose order is i into the $i^{th}$ target packet group.

If a sum of a size of each target packet group in the currently plurality of remaining target packet groups and the size of the original packet whose order is i is greater than the target size, it indicates that the $j^{th}$ target packet group does not exist in the plurality of target packet groups, and the processor may add a new target packet group as the $i^{th}$ target packet group, and group the original packet whose order is i into the $i^{th}$ target packet group.

The middle part in FIG. 4 is still used as an example. When i=3, a currently remaining target packet group is the second target packet group including the packets P4 and P3. If the sizes of the packets P4 and P3, and the packet P5 whose order is 3 are less than or equal to the target size, it indicates that the second target packet group is the $j^{th}$ target packet group in the at least one target packet group. The packets P4, P3, and P5 may be directly combined into a third target packet group. If the sizes of the packets P4 and P3, and the packet P5 whose order is 3 are greater than the target size, it indicates that the $j^{th}$ target packet group does not exist in the currently remaining target packet group, and the processor adds the third target packet group and groups the packet P5 into the newly added third target packet group. In this case, the second target packet group and the third target packet group remain.

Step 2025: After grouping a last original packet in the plurality of original packets, the processor uses each currently remaining target packet group as one packet group in the at least one packet group.

After the processor groups the last original packet, the currently remaining target packet group is a finally determined packet group. Therefore, the processor may use each currently remaining target packet group as one packet group in the at least one packet group.

The right part in FIG. 4 is used as an example. The processor combines the packets P4, P3, and P5 into the third target packet group. When i=4, the packet P2 whose order is 4 is a last packet in the packets P1 to P5. If a sum of sizes of the packets P4, P3, P5, and P2 is less than the target size, the processor combines the third target packet group and the packet P2 into a fourth target packet group. Currently, only the fourth target packet group remains. Therefore, the fourth target packet group is a final group of the packets P2 to P5. The fourth target packet group is also a concatenation solution. Because each concatenation solution is used to indicate to concatenate and obtain a concatenated packet whose size is the size of the first packet, if a size of a subsequent concatenated packet is less than the size of the first packet, data may be padded into the concatenated packet, so that the size of the concatenated packet is equal to the size of the first packet.

When the processor sets a quantity of original packets to the first target quantity instead of the second target quantity, the processor may, at intervals of preset time, group original packets buffered by the first network device within the preset time. A grouping process may be the process shown in steps 2021 to 2025. In this case, the target size may be a size of a largest packet in the original packets buffered by the first network device within the preset time, or may be a preset packet size. The preset packet size may be a size of a largest packet in a first data stream to which the plurality of original packets belong. When the original packets buffered by the first network device within the preset time are grouped into the third target quantity of packet groups, and none of the third target quantity of packet groups can include other packets, grouping ends. After the original packets buffered by the first network device within the preset time are grouped into at least one packet group, if a quantity of the at least one packet group is equal to the third target quantity, but the at least one packet group can include other packets, the processor may continuously collect new original packets until the at least one packet group cannot include a new original packet. In this case, grouping ends. If the quantity of the at least one packet group is less than the third target quantity, the processor may continuously collect new original packets and group the collected new original packets until the third target quantity of packet groups is obtained and none of the third target quantity of packet groups can include the new original packets. In this case, grouping ends.

Figure 5:
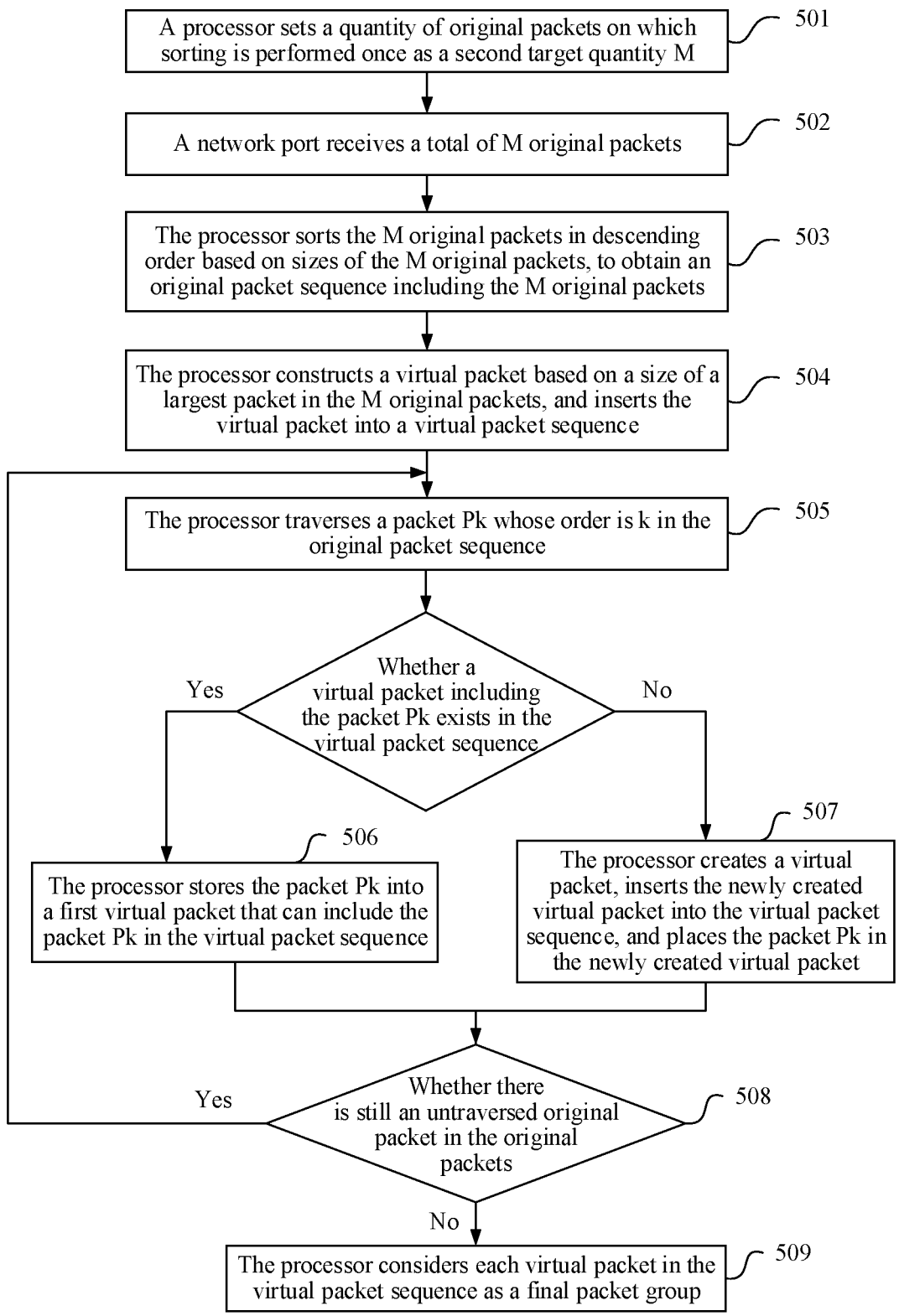
FIG. 5 is a flowchart of packet grouping according to an embodiment.

For ease of understanding the process shown in steps 2021 to 2025, refer to a flowchart of packet grouping according to an embodiment shown in FIG. 5. The process includes steps 501 to 509.

Step 501: A processor sets a quantity of original packets on which sorting is performed once as a second target quantity M, where M is a positive integer.

Step 502: A network port receives a total of M original packets.

Step 503: The processor sorts the M original packets in descending order based on sizes of the M original packets, to obtain an original packet sequence including the M original packets, where a larger original packet in the M original packets indicates a lower order, and a smaller original packet indicates a higher order in the original packet sequence.

Step 504: The processor constructs a virtual packet based on a size of a largest packet in the M original packets, and inserts the virtual packet into a virtual packet sequence, where a size of the virtual packet is a size of the largest packet in the M original packets, and the virtual packet is placed in the virtual packet sequence.

Each virtual packet may be considered as one virtual storage space, and a virtual storage size of the virtual storage space is the size of the largest packet in the M original packets. In other words, one virtual packet may be considered as one packet group.

Step 505: The processor traverses a packet Pk whose order is k in the original packet sequence, where $0 \leqslant k < M$.

Step 506: The processor queries whether a virtual packet including the packet Pk exists in the virtual packet sequence, and if the virtual packet exists, the processor stores the packet Pk into a first virtual packet that can include the packet Pk in the virtual packet sequence.

Step 507: If the virtual packet does not exist, the processor creates a virtual packet, inserts the newly created virtual packet into the virtual packet sequence, and places the packet Pk in the newly created virtual packet.

Step 508: After placing the packet Pk in the virtual packet, the processor queries whether there is still an untraversed original packet in the original packets, and if there is an untraversed original packet, skips to perform step 505; otherwise, performs step 509.

Step 509: After traversing all the original packets in the original packet sequence, the processor considers each virtual packet in the virtual packet sequence as a final packet group.

Figure 6:
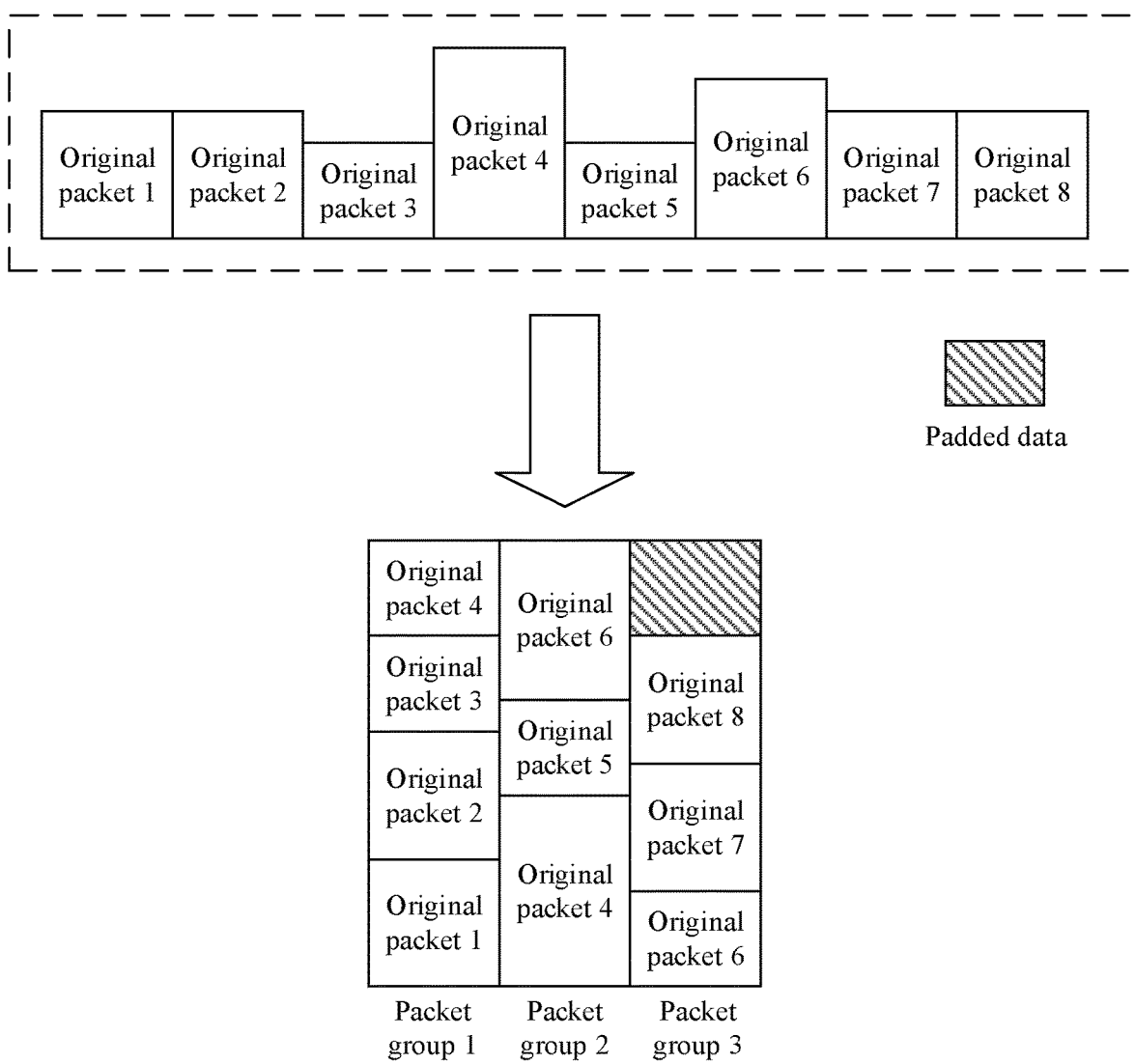
FIG. 6 is a schematic diagram of an original packet grouping process according to an embodiment.

In some possible implementations, when grouping the plurality of original packets, the processor may group some data included in one original packet into one packet group, and group other data included in the original packet into another packet group. In a possible implementation, in a grouping process, the processor groups a received first original packet into a first packet group. A size of the first packet group is a target size, and the target size may be any preset size. If a size of the original packet is less than or equal to the target size, the processor groups the first original packet into the first packet group. If the size of the first original packet is greater than the target size, the processor virtually splits the first original packet into at least two data blocks, where a size of a last data block in the at least two data blocks is less than or equal to the target size, and sizes of other data blocks other than the last data block in the at least two data blocks are all equal to the target size. The processor separately groups each data block into one packet group. When the processor subsequently receives a new original packet, if a sum of a size of the new original packet and a size of a last packet group in all current packet groups is less than or equal to the target size, the processor groups the new original packet into the last packet group. If the sum of the sizes of the new original packet and the size of the last packet group in all the current packet groups is greater than the target size, the processor virtually splits the new original packet into one first target data block and at least one second target data block, where a size of the first target data block is a difference between a target size of a last packet and a current size of the last packet, a size of a last data block in the at least one second target data block is less than or equal to the target size, and sizes of data blocks other than the last data block in the at least one second target data block are all equal to the target size. The processor groups the first target data block into the last packet group, adds at least one packet group, and groups each second target data block into the newly added packet group. After the processor groups the second target quantity of original packets, or after the processor determines a first target quantity of packet groups, where the first target quantity of packet groups cannot include other original packets, grouping ends. For example, FIG. 6 is a schematic diagram of an original packet grouping process according to an embodiment. Original packets 1 to 8 are grouped this time, and a size of each packet group is always a target size. A processor classifies original packets 1 to 2 and a first part of an original packet 4 into a packet group 1, classifies a last part of the original packet 4, an original packet 5 and a first part of an original packet 6 into a packet group 2, and classifies the last part of the original packet 6 and original packets 7 to 8 into a packet group 2. A size of the packet group 3 is less than the target size. Subsequently, data may be padded to a concatenated packet obtained by concatenating packets in the packet 3 so that a size of padded packets is the target size.

In a possible implementation, when the first network device directly performs FEC encoding on the plurality of original packets by using the processor, the processor directly performs the following step 205, to be specific, performs concatenation processing on each packet group, to obtain the at least one concatenated packet. Each concatenated packet corresponds to one packet group. The processor does not interact with a target hardware engine. If the first network device performs FEC encoding on the plurality of original packets by using the target hardware engine, the processor performs the following step 203.

The following describes step 203.

Figure 7:
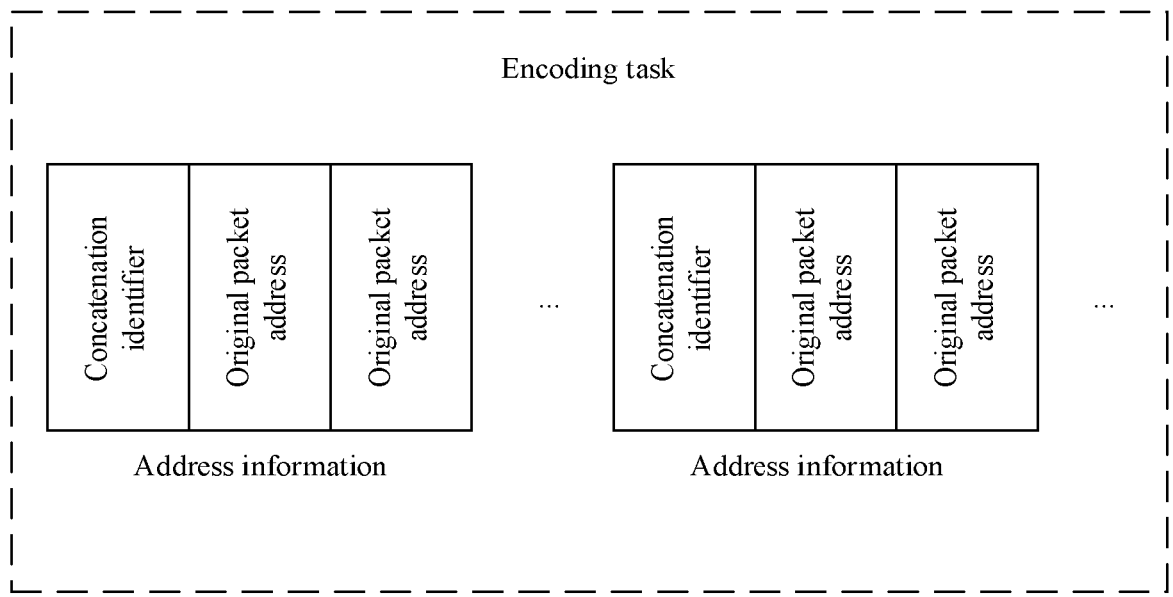
FIG. 7 is a schematic diagram of an encoding task according to an embodiment.

In step 203, an encoding task is used to indicate to concatenate original packets in each packet group into one concatenated packet, and encode a plurality of concatenated packets. Address information of each packet group includes storage addresses of all the original packets in the packet group. In some possible implementations, the address information of each packet group further includes a concatenation identifier. For example, FIG. 7 is a schematic diagram of an encoding task according to an embodiment. The encoding task in FIG. 7 includes a plurality of pieces of address information. Each piece of address information includes a concatenation identifier and storage addresses of original packets. The concatenation identifier may be used to indicate to concatenate all original packets in one packet group into one concatenated packet. The concatenation identifier may be further used to indicate that all storage addresses in address information of the packet group form one group. A manner of representing the concatenation identifier is not specifically limited in this embodiment.

The address information of each packet group may be represented in a form of a set. For example, a packet group 2 includes original packets 3 and 4. If a set 1 includes storage addresses and concatenation identifiers of the original packets 3 and 4, the set 1 is address information of the packet group 2. In some possible implementations, the address information of each packet group may be represented in a form of a character string. The packet group 2 is still used as an example. A character string 1 is "a storage address of the original packet 3; a storage address of the original packet 4, and a concatenation identifier". The character string 1 is ALSO the address information of the packet group 2. In some possible implementations, the address information of each packet group may be represented in a form of a table. The packet group 2 is still used as an example. Refer to the following Table 1. Storage addresses of the original packets 3 and 4 in Table 1 correspond to a same concatenation identifier. Table 1 is also the address information of the packet group 2.

TABLE 1

| Storage address | Concatenation identifier |
|---|---|
| A storage address of an original packet 3 | |
| A storage address of an original packet 4 | |

The encoding task may further carry a storage address of the first packet, so that the target hardware engine may subsequently obtain the first packet according to the storage address of the first packet. The encoding task may further carry at least one of an encoding parameter, a data stream identifier, or a priority identifier of the first data stream. The first data stream is a data stream in which the plurality of original packets are located. The encoding parameter may include a quantity of to-be-encoded packets (that is, the first target quantity), a quantity of redundant packets, and the target size. The quantity of to-be-encoded packets is a sum of the quantity of the first packets in the plurality of original packets and the quantity of the at least one packet group. The target hardware engine may subsequently encode the plurality of original packets based on the encoding parameter.

The following describes step 205.

In step 205, the target hardware engine may obtain the at least one packet group from the memory based on the address information in the encoding task, where an original packet in each packet group is a packet stored in one storage address in one piece of address information, and concatenates the original packets in each packet group into the concatenated packet, so that the target hardware engine can obtain the at least one concatenated packet.

When the first network device encodes the plurality of original packets by using the processor, if the sum of the quantity of the at least one packet group and the quantity of the first packets in the plurality of original packets reaches the first target quantity, and when a last packet group in the at least one packet group cannot include other original packets other than the plurality of packets, the processor performs concatenation processing on each packet group. The first target quantity is a dimension of a to-be-encoded matrix when FEC encoding is performed.

Alternatively, when the quantity of the plurality of original packets is equal to the second target quantity, and the second target quantity of original packets are grouped into the at least one packet group, the processor performs concatenation processing on each packet group, where the second target quantity is a preset quantity of original packets required to perform FEC coding once. A process in which the processor performs concatenation processing on each packet group is similar to a process in which the target hardware engine performs concatenation processing on each packet group. The process in which the processor performs concatenation processing on each packet group is not described again in this embodiment.

The following describes step 207.

In step 207, the target hardware engine may obtain the encoding parameter from the encoding task. It is assumed that the quantity of to-be-encoded packets in the encoding parameter is Q, the quantity of redundant packets is R, and the target size is L, where both Q and R are positive integers, L is a value greater than 0, the quantity R of redundant packets is a quantity of redundant packets obtained after FEC encoding is performed on the Q to-be-encoded packets, and the Q to-be-encoded packets include the first packet in the plurality of original packets and the equal-length data block. The target hardware engine may obtain the first packet from the memory based on the storage address of the first packet carried in the encoding task, and use the obtained first packet and the equal-length data block obtained in step 206 as the to-be-encoded packet. The target hardware engine may first use the Q to-be-encoded packets to form a Q*L to-be-encoded matrix, where each row of the to-be-encoded matrix is one equal-length data block or one first packet. The target hardware engine constructs a (Q+R)*q generator matrix based on the quantity Q of to-be-encoded packets and the quantity R of redundant packets. The generator matrix includes a first submatrix and a second submatrix. The first submatrix is a Q*Q identity matrix and the second submatrix is an R*Q Cauchy matrix.

An element in an $i^{th}$ row and a $j^{th}$ column in the second submatrix is $$\frac{1}{x_{i-1} + y_{j-1}}.$$

$x_{i-1}$ and $y_{j-1}$ are elements in a Galois field (GF) ($2^w$), where i and j are both integers greater than or equal to 0, and w may be 8. The target hardware engine performs multiplication on the generator matrix and the to-be-encoded matrix, to obtain a (Q+R)*L coding matrix. The coding matrix includes the to-be-encoded matrix and an R*L check matrix. Each row of the check matrix is one redundant packet.

In a possible implementation, a process shown in steps 205 to 207 is the process in which the target hardware engine performs concatenation processing on each packet group based on the encoding task. When the first network device encodes the plurality of original packets by using the processor, the processor may perform step 207.

The following describes step 208.

In step 208, when the size of each concatenated packet in the at least one concatenated packet is equal to the size of the first packet, the at least one packet may be considered as one equal-length data block. Therefore, the target hardware engine may directly perform step 208. In a possible implementation, when the first network device encodes the plurality of original packets by using the processor, the processor may perform step 207.

After obtaining the at least one redundant packet, the target hardware engine stores the at least one redundant packet in the memory, and sends an encoding complete message to the processor, where the encoding complete message may carry a storage address of the at least one redundant packet, so that the processor can obtain the at least one redundant packet from the memory. Alternatively, the target engine directly sends the at least one redundant packet to the processor. A manner in which the processor obtains the at least one redundant packet is not specifically limited in this embodiment.

The processor may obtain the original packets in each packet group from the memory and perform concatenation processing on each packet group, to obtain the at least one concatenated packet. When the size of the any concatenated packet in the at least one concatenated packet is less than the size of the first packet, the processor performs padding processing on the at least one concatenated packet, to obtain the equal-length data block, and obtain the first packet in the plurality of the original packets from the memory. Certainly, the target hardware engine may further directly send the equal-length data block and the first packet to the processor. A manner in which the processor obtains the equal-length data block and the first packet is not specifically limited in this embodiment.

Figure 8:
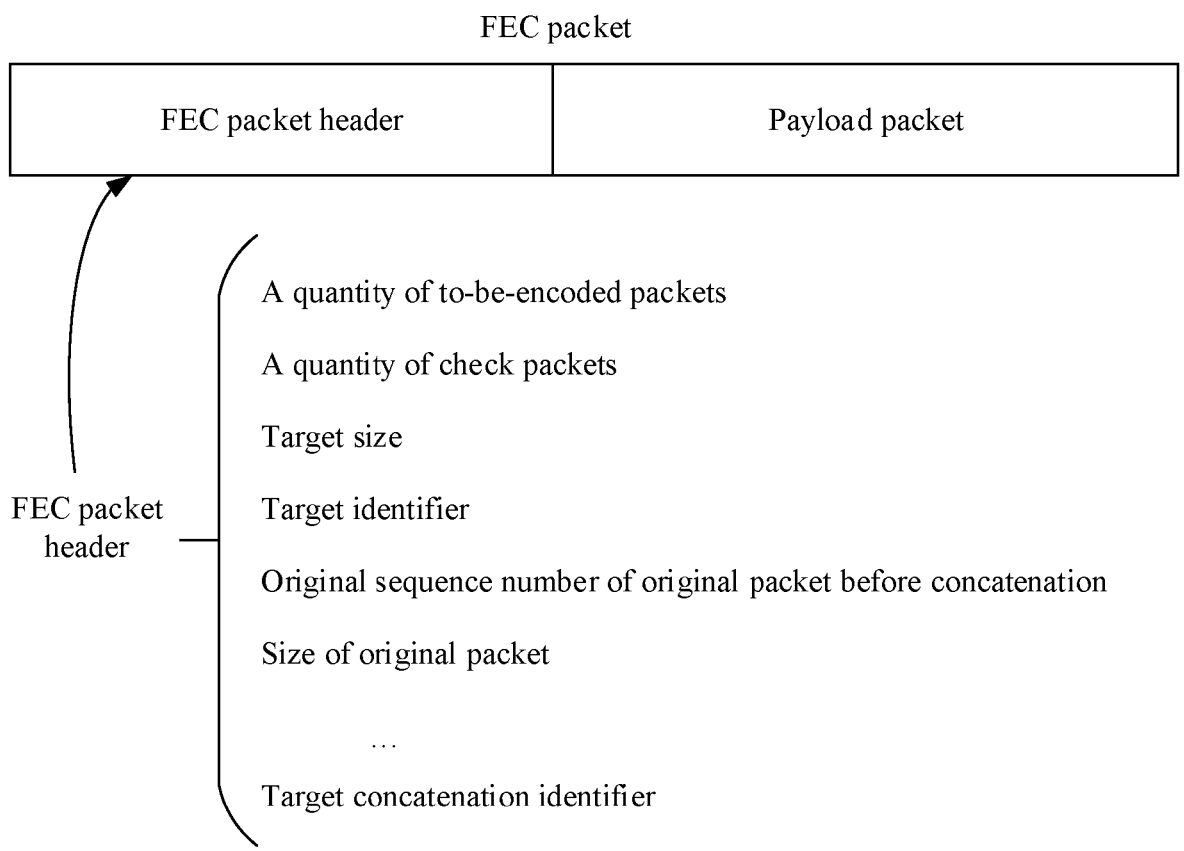
FIG. 8 is a schematic diagram of an FEC packet according to an embodiment.

After the processor obtains the equal-length data block, the first packet, and the at least one redundant packet, the processor adds an FEC packet header to the equal-length data block and each data block in the first packet, to obtain a plurality of original FEC packet, and adds an FEC packet header to each redundant packet, to obtain at least one redundant FEC packet. The FEC packet header carries the encoding parameter. For example, FIG. 8 is a schematic diagram of an FEC packet according to an embodiment. The FEC packet includes the FEC packet and a payload packet. When the payload packet is the first packet or a data block in the equal-length data block, the FEC packet is an original FEC packet. When the payload packet of the FEC packet is the redundant packet, the FEC packet is a redundant FEC packet.

The FEC packet header is used to indicate encoding statuses of the plurality of original packets. The FEC packet header carries encoding parameters in the plurality of original packets. For example, the FEC packet header in FIG. 8 carries the quantity of to-be-encoded packet, the quantity of redundant packet, and the target size. The FEC packet header may further carry target identifiers of the plurality of original packets. The target identifier is used to indicate a quantity of times of encoding the data stream to which the plurality of original packets belong. The FEC packet header may further carry sequence numbers of the plurality of original packets in the data stream (that is, original sequence numbers of the original packets before concatenation), the size of the original packet, a sequence number of each first packet and a sequence number of each data block of the equal-length data block in the to-be-encoded matrix, a sequence number of each redundant packet in the encoding matrix, and a target concatenation identifier corresponding to each data block. The target concatenation identifier is used to indicate that the data block is a concatenated data block.

After obtaining the original FEC packet and the redundant FEC packet, the processor may send the original FEC packet and the redundant FEC packet to the second network device. Certainly, in some possible implementations, the target hardware engine may directly encapsulate the first packet and the equal-length data block into the original FEC packet, encapsulate the redundant packet into the redundant FEC packet, and send the original FEC packet and the redundant FEC packet to the second network device.

Figure 9:
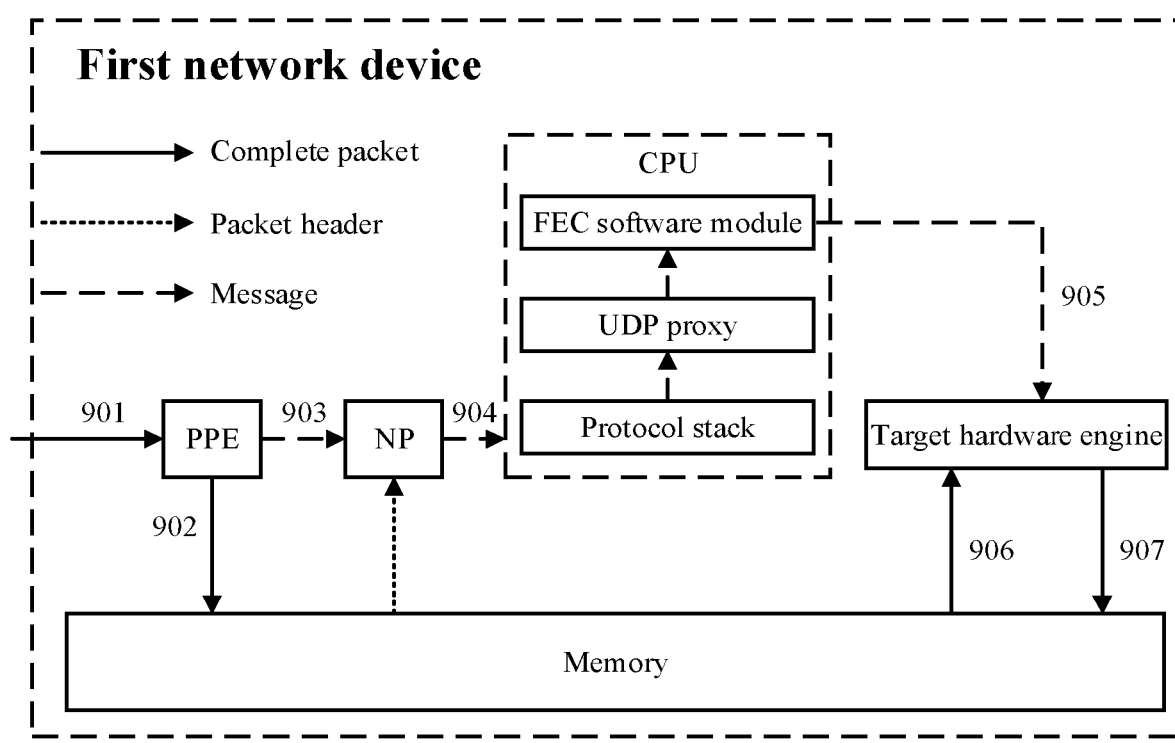
FIG. 9 is a schematic flowchart of interaction in a network device according to an embodiment.

Refer to FIG. 9. An embodiment provides a schematic flowchart of interaction in a network device. The process specifically includes steps 901 to 907. FIG. 9 shows switching of internal modules when a first network device performs FEC encoding on a plurality of original packets.

Step 901: Each time a network port receives one original packet from a network, the network port sends the original packet to a PPE.

Step 902: The PPE writes the received original packet into a memory.

Step 903: The PPE sends a storage complete message of the original packet to an NP, to indicate the NP to process the original packet in the memory.

Step 904: After the NP receives the storage complete message, the NP parses the original packet to determine whether the original packet needs to be encoded, and if the original packet needs to be encoded, the NP sends an encoding notification message of the original packet to a CPU.

The CPU may send the encoding complete message to an FEC software module by using a protocol stack and a UDP proxy. For a specific process, refer to related description of the foregoing step 2012. Details are not described herein again.

Step 905: After the FEC software module in the CPU collects a second target quantity of encoding notification messages, in other words, the FEC software module collects the second target quantity of to-be-encoded original packets, the FEC software module sends, based on the second target quantity of original packets, an encoding task for the second target quantity of original packets to the target hardware engine.

The encoding task is equivalent to a notification message that indicates the target hardware processor to perform FEC encoding based on the encoding task.

Step 906: The target hardware engine obtains the second target quantity of original packets from the memory based on the encoding task, and performs FEC encoding on the second target quantity of original packets, to obtain the at least one redundant packet.

A process shown in the step 906 is similar to the process shown in steps 205 to 207. The process shown in the step 906 is not described herein again in this embodiment.

Step 907: The target hardware engine writes the at least one redundant packet into the memory, and sends the storage address of the at least one redundant packet to the FEC software module, so that the FEC software module obtains the at least one redundant packet and sends the second target quantity of original packets and the at least one redundant packet to the second network device.

In a possible implementation, the FEC software module may be deployed in the NP, or may be deployed in the CPU. A deployment manner of the FEC software module is not specifically limited in this embodiment.

According to the method provided in this embodiment, concatenation processing is performed on other original packets other than the largest first packet in the plurality of original packets. Padding processing is performed on the concatenated packet only when the size of the concatenated packet is less than the size of the largest packet, without performing padding processing on each of the other original packets. Therefore, less data needs to be padded to obtain the equal-length data block after padding. This reduces occupied network bandwidth when FEC encoding packets are transmitted, and avoids a waste of network resources.

Figure 10:
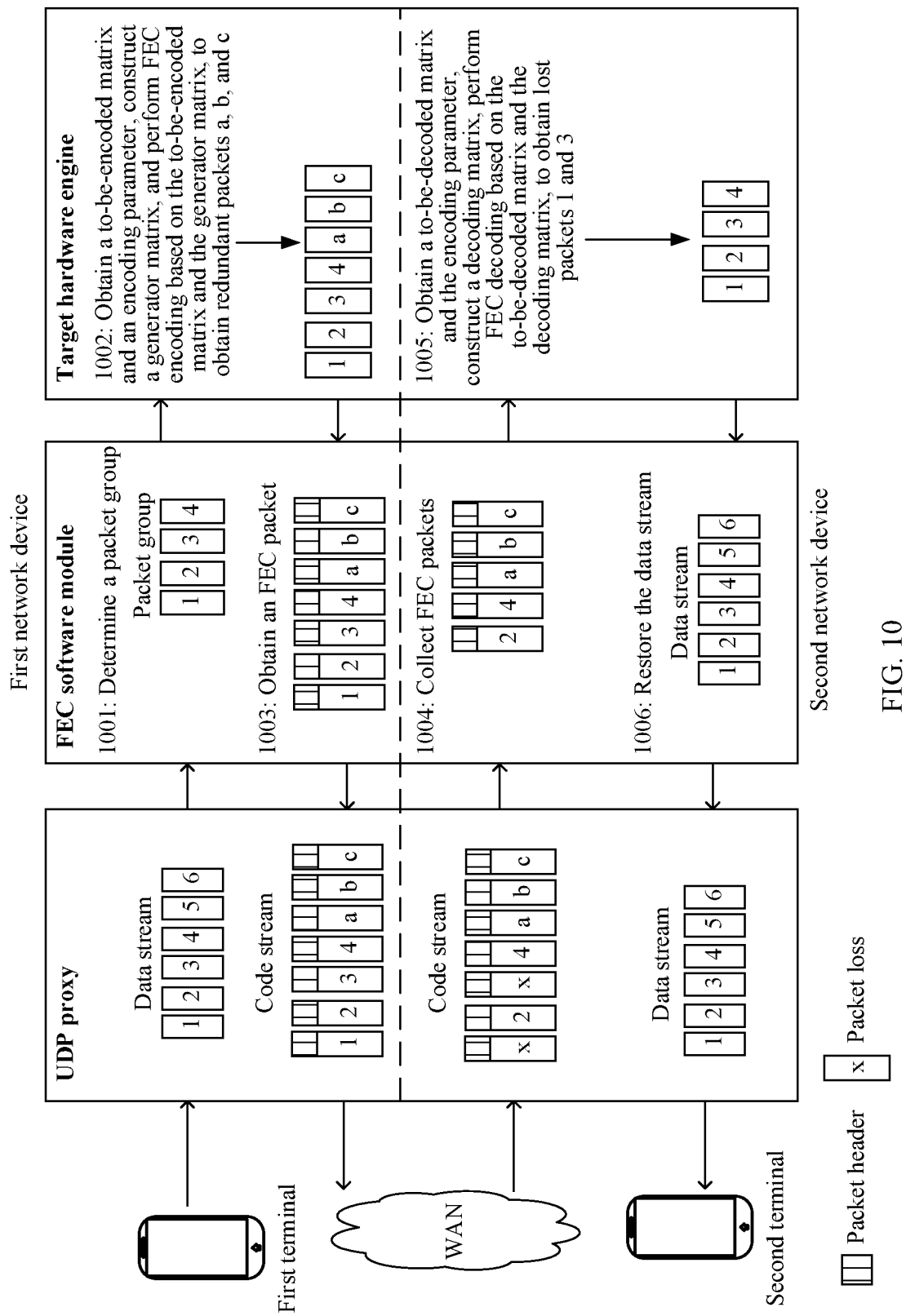
FIG. 10 is a flowchart of encoding and decoding according to an embodiment.

When the second network device receives the FEC packet sent by the first network device, if the original FEC packet is lost in a transmission process, the second network device decodes an unlost FEC packet to recover the lost packet. An encoding and decoding process of the plurality of original packets is further described. FIG. 10 is a flowchart of encoding and decoding according to an embodiment. The process includes the following steps 1001 to 1006.

Step 1001: After an FEC software module in a first network device collects a second target quantity of original packets, the FEC software module determines a first packet in the second target quantity of original packets and at least one packet group based on the second target quantity of original packets, and sends an encoding task to a target hardware engine.

Before step 1001, a UDP proxy collects original packets in a data stream sent by a first terminal, and sends storage addresses of the collected original packets and sizes of the original packets to the FEC software module. After the FEC software module receives the storage addresses and the sizes of the second target quantity of the original packets, the FEC software module performs step 1001. For example, the second target quantity is 6. After the FEC software module collects storage addresses and sizes of original packets 1 to 6 from the UDP proxy, it indicates that the FEC software module collects six original packets. The FEC software module uses the original packet 1 as a first packet, and groups the original packets 2 and 4 into a packet group 1. The FEC software module uses the original packet 6 as a first packet, and groups the original packets 3 and 5 into a packet group 2. The FEC software module may further concatenate the original packets 2 and 4 into a concatenated packet 1, and concatenate the original packets 3 and 5 into a concatenated packet 2. When a size of any concatenated packet is less than a size of the original packet 3, the FEC software module performs padding processing on the any concatenated packet, to obtain a padded packet. Otherwise, the FEC software module does not perform padding processing on the any concatenated packet. FIG. 10 shows an example in which the size of the any concatenated packet is the size of the original packet 3. The FEC software module uses the original packets 1 and 6 and the concatenated packets 1 and 2 as one to-be-encoded matrix. In FIG. 10, the original packet 1 is denoted as a packet 1 in the to-be-encoded matrix. The concatenated packets 1 and 2 are separately denoted as packets 2 and 3 in the to-be-encoded matrix, and the original packet 6 is denoted as a packet 4 in the to-be-encoded matrix.

Step 1002: The target hardware engine obtains, based on an address set in the encoding task, the to-be-encoded matrix formed by the original packets 1 and 6 and the concatenated packets 1 and 2, constructs a corresponding generator matrix based on an encoding parameter in the encoding task, performs FEC encoding based on the to-be-encoded matrix and the generator matrix, to obtain redundant packets a, b, and c, stores the redundant packets a, b, and c in a memory, and sends storage addresses of the redundant packets a, b, and c to the FEC software module.

Step 1003: The FEC software module obtains the redundant packets a, b, and c from the memory based on the storage addresses of the redundant packets a, b, and c, and separately adds one FEC packet header to the packets 1 to 4 and the redundant packets a to c, to obtain a plurality of FEC packets, and sends a code stream formed by the FEC packets to the UDP proxy; the UDP proxy sends the code stream to a second network device over a WAN.

Step 1004: A UDP proxy of the second network device receives the code stream, where the packets 1 and 3 in the code stream are lost; after an FEC software module in the second network device collects the packets 2 and 4 and any two redundant packets of the redundant packets a, b, and c, the FEC software module delivers a decoding task to a target hardware engine in the second network device, where the decoding task carries the storage addresses and decoding parameters of the packets 2 and 4 and any two redundant packets of the redundant packets a, b, and c, where the decoding parameters include a quantity of packets whose encoding parameters are lost, locations of the lost packets in the to-be-encoded matrix, and a target size.

Step 1005: The target hardware engine obtains the packets 2 and 4, and the any two redundant packets of the redundant packets a, b, and c from the memory based on the storage addresses in the decoding task, uses the packets 2 and 4 and the any two redundant packets of the redundant packets a, b, and c to form a to-be-decoded matrix, constructs a corresponding decoding matrix based on the decoding parameters, performs FEC decoding based on the to-be-decoded matrix and the decoding matrix, to obtain the lost packets 1 and 3, where the lost packets 1 and 3 are stored in the memory, and sends the storage addresses of the packets 1 and 3 to the FEC software module.

Step 1006: The FEC software module obtains storage addresses of the original packet 1 and the concatenated packet 1 from the memory based on storage addresses of the original packet 1 and the concatenated packet 1, obtains the original packet 2 and the concatenated packet 2, splits the concatenated packet 1 into the original packets 2 and 3, splits the concatenated packet 2 into the original packets 3 and 5, restores an order of the original packets 1 to 6 in the data stream, sends the original packets 1 to 6 to the UDP proxy in the order, to form the data stream; the UDP proxy sends the data stream to a second terminal.

Figure 11:
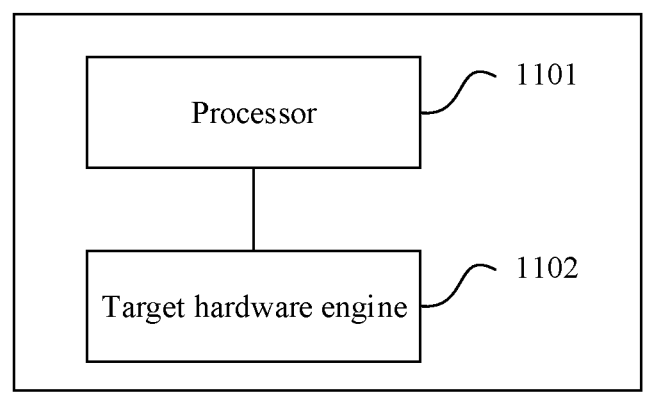
FIG. 11 is a schematic diagram depicting a structure of a packet processing apparatus according to an embodiment.

FIG. 11 is a schematic diagram depicting a structure of a packet processing apparatus according to an embodiment. The apparatus 1100 includes a processor 1101.

The processor 1101 is configured to perform the foregoing step 201.

The processor 1101 is further configured to perform concatenation processing on other original packets other than a first packet in the plurality of original packets based on a size of the first packet in the plurality of original packets, to obtain at least one concatenated packet, where the first packet is a packet with a largest data amount in the plurality of original packets.

When a size of any concatenated packet in the at least one concatenated packet is less than the size of the first packet, the processor 1101 is further configured to perform padding processing on the at least one concatenated packet, to obtain an equal-length data block, where a size of each data block in the equal-length data block is the size of the first packet.

The processor 1101 is further configured to perform FEC encoding processing on the first packet and the equal-length data block, to obtain at least one redundant packet.

Optionally, the apparatus further includes a memory configured to store program instructions. The processor 1101 may be a CPU configured to run the instructions stored in the memory, to implement the packet processing method shown in FIG. 2.

In a possible implementation, the processor 1101 is configured to: perform step 202; and perform concatenation processing on each packet group, to obtain the at least one concatenated packet, where each concatenated packet corresponds to one packet group.

In a possible implementation, the packet processing apparatus further includes a target hardware engine 1102.

The processor 1101 is further configured to perform the foregoing steps 202 and 203.

The target hardware engine 1102 is configured to perform the foregoing step 205.

In a possible implementation, the processor 1101 is configured to: sort the plurality of original packets based on a size of each original packet in the plurality of original packets, to obtain an order i of each original packet, where i is an integer greater than or equal to 0, and an original packet whose order is 0 is the first packet; when i=1, group an original packet whose order is 1 into a first target packet group, where an order of the first target packet group is 1; when i>1, if a sum of a size of a $j^{th}$ target packet group and a size of the original packet whose order is i is less than or equal to a target size, combine the $j^{th}$ target packet group and the original packet whose order is i into an $i^{th}$ target packet group, where the target size is the size of the first packet, the $j^{th}$ target packet group is a packet group with a lowest order in at least one target packet group, an order of the $j^{th}$ target packet group is j, a sum of a size of each packet group in the at least one target packet group and a size of the original packet whose order is i is less than or equal to the target size, and 0<j<i; when i>1, if the $j^{th}$ target packet group does not exist, add one $i^{th}$ target packet group, and group the original packet whose order is i into the $i^{th}$ target packet group; and after grouping a last original packet in the plurality of original packets, use each currently remaining target packet group as one packet group in at least one packet group.

In a possible implementation, the processor 1101 is further configured to: when a sum of a quantity of at least one packet groups and a quantity of the first packets in the plurality of original packets reaches a first target quantity, and other original packets other than the plurality of original packets cannot be added to the at least one packet group, perform concatenation processing on each packet group, where the first target quantity is a dimension of a to-be-encoded matrix when FEC encoding is performed; or when a quantity of the plurality of original packets is equal to a second target quantity, and the second target quantity of original packets are grouped into the at least one packet group, perform concatenation processing on each packet group, where the second target quantity is a preset quantity of original packets required to perform FEC coding once.

In a possible implementation, the processor 1101 is further configured to: when a size of each concatenated packet in the at least one concatenated packet is equal to the size of the first packet, perform FEC encoding processing on the first packet and the at least one concatenated packet, to obtain at least one redundant packet.

In a possible implementation, the target hardware engine 1101 is further configured to perform step 208.

All of the foregoing optional technical solutions may form optional embodiments of this disclosure through any combination. Details are not described herein again.

When the packet processing apparatus provided in the foregoing embodiment performs packet processing, division into the foregoing function modules is merely used as an example for illustration. In actual application, the foregoing functions may be allocated to different function modules and implemented based on a requirement, that is, an inner structure of an apparatus is divided into different function modules to complete all or some of the functions described above. In addition, the packet processing apparatus provided in the foregoing embodiment and the method embodiments pertain to a same concept. For a specific implementation process of the apparatus, refer to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments, but are not intended to limit this disclosure. Any modification, equivalent replacement, or improvement made without departing from the principle of this disclosure should fall within the protection scope of this disclosure.

What is claimed is:

1. A method comprising:
    obtaining original packets comprising at least one first original packet and second original packets, wherein a first size of the at least one first original packet is the largest among the original packets;
    performing, based on the first size, concatenation processing on the second original packets to obtain a concatenated packet having a second size;
    performing, when the second size is less than the first size, padding on the concatenated packet to obtain data blocks, wherein each of the data blocks has the first size, and wherein the data blocks comprise a first data block; and
    performing forward error correction (FEC) encoding on the at least one first original packet and the first data block to obtain a redundant packet.

2. The method of claim 1, wherein performing the concatenation processing comprises:
    grouping, based on the first size, the second original packets to obtain a packet group, wherein a sum of third sizes of the second original packets in the packet group is less than or equal to the first size; and
    performing the concatenation processing on the packet group to obtain the concatenated packet.

3. The method of claim 2, further comprising further performing the concatenation processing when a sum of a quantity of at least one packet groups and a quantity of the at least one first original packet reaches a target quantity and when additional original packets cannot be added to the packet group, wherein the target quantity is a dimension of a matrix for the FEC encoding.

4. The method of claim 2, further comprising further performing the concatenation when a quantity of the original packets is equal to a target quantity and when the target quantity are grouped into at least one packet group, wherein the target quantity is a preset quantity of original packets required to perform the FEC encoding.

5. The method of claim 1, wherein performing the concatenation processing comprises:
    grouping, by a processor and based on the first size, the second original packets to obtain a packet group;

generating, by the processor and based on the packet group, an encoding task comprising address information of the packet group; and performing, by a target hardware engine and based on the encoding task, the concatenation processing on the packet group to obtain the concatenated packet.

6. The method of claim 1, further comprising further performing, when the concatenated packet has the first size, the FEC encoding on the concatenated packet to obtain the redundant packet.

7. An apparatus comprising:
a memory configured to store instructions; and
a processor coupled to the memory and configured to execute the instructions to cause the apparatus to:
obtain original packets comprising at least one first original packet and second original packets, wherein a first size of the at least one first original packet is the largest among the original packets;
perform, based on the first size, concatenation processing on the second original packets to obtain a concatenated packet having a second size;
perform, when the second size is less than the first size, padding processing on the concatenated packet to obtain data blocks, wherein each of the data blocks has the first size, and wherein the data blocks comprise a first data block; and
perform forward error correction (FEC) encoding on the at least one first original packet and the first data block to obtain a redundant packet.

8. The apparatus of claim 7, wherein the processor is further configured to execute the instructions to cause the apparatus to:
group, based on the first size, the second original packets to obtain a packet group, wherein a sum of third sizes of the second original packets in the packet group is less than or equal to the first size; and
perform the concatenation processing on the packet group to obtain the concatenated packet.

9. The apparatus of claim 8, wherein the processor is further configured to execute the instructions to cause the apparatus to further perform the concatenation processing when a sum of a quantity of at least one packet groups and a quantity of the at least one first original packet reaches a target quantity and when additional original packets cannot be added to the packet group, and wherein the target quantity is a dimension of a matrix for the FEC encoding.

10. The apparatus of claim 8, wherein the processor is further configured to execute the instructions to cause the apparatus to further perform the concatenation processing when a quantity of the original packets is equal to a target quantity and when the target quantity are grouped into at least one packet group, wherein the target quantity is a preset quantity of original packets required to perform the FEC encoding.

11. The apparatus of claim 7, wherein the processor is further configured to execute the instructions to cause the apparatus to:
group, based on the first size, the second original packets to obtain a packet group; and
generate, based on the packet group, an encoding task comprising address information of the packet group, and
wherein the apparatus further comprises a target hardware engine configured to perform, based on the encoding task, the concatenation processing on the packet group to obtain the concatenated packet.

12. The apparatus of claim 7, wherein the processor is further configured to execute the instructions to further cause the apparatus to perform, when the concatenated packet has the first size, the FEC encoding on the concatenated packet to obtain the redundant packet.

13. A computer program product comprising instructions that are stored on a computer-readable medium and that, when executed by a processor, cause an apparatus to:
obtain original packets comprising at least one first original packet and second original packets, wherein a first size of the at least one first original packet is the largest among the original packets;
perform, based on the first size, concatenation processing on the second original packets to obtain a concatenated packet having a second size;
perform, when the second size is less than the first size, padding processing on the concatenated packet to obtain data blocks, wherein each of the data blocks has the first size, and wherein the data blocks comprise a first data block; and
perform forward error correction (FEC) encoding on the at least one first original packet and the first data block to obtain a redundant packet.

14. The computer program product of claim 13, wherein the instructions, when executed by the processor, further cause the apparatus to group, based on the first size, the second original packets to obtain a packet group, wherein a sum of third sizes of the second original packets in the packet group is less than or equal to the first size.

15. The computer program product of claim 14, wherein the instructions, when executed by the processor, further cause the apparatus to perform the concatenation processing on the packet group to obtain the concatenated packet.

16. The computer program product of claim 15, wherein the instructions, when executed by the processor, further cause the apparatus to further perform the concatenation processing when a sum of a quantity of at least one packet groups and a quantity of the at least one first original packet reaches a target quantity and when additional original packets cannot be added to the packet group, and wherein the target quantity is a dimension of a matrix for the FEC encoding.

17. The computer program product of claim 15, wherein the instructions, when executed by the processor, further cause the apparatus to further perform the concatenation processing when a quantity of the original packets is equal to a target quantity and when the target quantity are grouped into at least one packet group, wherein the target quantity is a preset quantity of original packets required to perform the FEC encoding.

18. The computer program product of claim 13, wherein the instructions, when executed by the processor, further cause the apparatus to:
group, based on the first size, the second original packets to obtain a packet group; and
generate, based on the packet group, an encoding task comprising address information of the packet group.

19. The computer program product of claim 18, wherein the instructions, when executed by the processor, further cause the apparatus to perform, based on the encoding task, the concatenation processing on the packet group to obtain the concatenated packet.

20. The computer program product of claim 13, wherein the instructions, when executed by the processor, further cause the apparatus to perform, when the concatenated packet has the first size, the FEC encoding on the concatenated packet to obtain the redundant packet.

\* \* \* \* \*